United States Patent
Eckhardt et al.

(10) Patent No.: US 7,380,865 B2
(45) Date of Patent: Jun. 3, 2008

(54) VEHICLE DOOR AND METHOD FOR THE PRODUCTION THEREOF

(75) Inventors: Bernhard Eckhardt, Wetzlar (DE); Harald Köllner, Altenstadt (DE); Werner Schwarz, Insheim (DE); Freddy Stoof, Horbourg-Wihr (FR); Peter Rahmstorf, Saint Laurent du Pont (FR); Norbert Bonhoff, Borgen (DE); Heinz-Josef Rüsche, Drolshagen-Bleche (DE); Wilfrid Bergeret, Marienthal (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 148 days.

(21) Appl. No.: 10/511,376

(22) PCT Filed: Apr. 16, 2003

(86) PCT No.: PCT/EP03/03967

§ 371 (c)(1),
(2), (4) Date: May 16, 2005

(87) PCT Pub. No.: WO03/086795

PCT Pub. Date: Oct. 23, 2003

(65) Prior Publication Data

US 2005/0200159 A1 Sep. 15, 2005

(30) Foreign Application Priority Data

Apr. 16, 2002 (DE) ............................. 102 17 831

(51) Int. Cl.
*B60J 10/08* (2006.01)

(52) U.S. Cl. ................................................. 296/146.2

(58) Field of Classification Search ............. 296/146.2, 296/146.1, 146.5
See application file for complete search history.

(56) References Cited

U.S. PATENT DOCUMENTS

| | | | | |
|---|---|---|---|---|
| 4,469,732 A | * | 9/1984 | Isaksen et al. ............... 428/80 |
| 4,588,627 A | * | 5/1986 | Isaksen et al. ............... 428/80 |
| 4,604,302 A | * | 8/1986 | Isaksen et al. ........... 427/208.6 |
| 4,696,848 A | * | 9/1987 | Jones et al. ................... 428/80 |
| 4,865,791 A | * | 9/1989 | Ferro et al. .................. 264/134 |
| 4,873,132 A | * | 10/1989 | Jones et al. ................... 428/80 |
| 5,298,694 A | * | 3/1994 | Thompson et al. ......... 181/286 |
| 5,961,904 A | * | 10/1999 | Swan et al. ................. 264/103 |

(Continued)

FOREIGN PATENT DOCUMENTS

DE 31 19 701 A1 12/1982

(Continued)

Primary Examiner—H Gutman
(74) Attorney, Agent, or Firm—Leydig, Voit & Mayer, Ltd.

(57) ABSTRACT

The invention relates to a vehicle door (1) and to a method for the production thereof. The vehicle door comprises a supporting frame (11) with an opening (2). The supporting frame is joined to a body structure of the vehicle in a manner that permits it to move. The opening (2) is closed in an essentially moisture-proof manner by molding it with a curable compound while forming a supporting plate (10) for accommodating elements such as window lifters, loudspeakers (3) or the like. At least one guide rail for guiding a window pane (9), which can be displaced relative to the supporting frame, is provided for accommodating a lateral edge of the window pane in the supporting plate.

25 Claims, 3 Drawing Sheets

U.S. PATENT DOCUMENTS

| | | |
|---|---|---|
| 6,185,872 B1* | 2/2001 | Seeberger et al. ............ 49/502 |
| 6,302,472 B1* | 10/2001 | Rahmstorf et al. ....... 296/146.5 |
| 6,612,641 B2* | 9/2003 | Schutt et al. ................ 296/152 |
| 6,669,265 B2* | 12/2003 | Tilton et al. ............. 296/146.1 |
| 6,890,018 B1* | 5/2005 | Koa et al. ................ 296/146.5 |
| 6,898,901 B2* | 5/2005 | Petroski et al. ............... 49/502 |
| 6,983,978 B2* | 1/2006 | Radu et al. .............. 296/146.7 |
| 7,055,887 B2* | 6/2006 | Williams et al. ......... 296/146.7 |
| 2001/0000584 A1* | 5/2001 | Spengler .................. 156/309.6 |
| 2001/0038228 A1 | 11/2001 | Morrison et al. |
| 2002/0030383 A1* | 3/2002 | Gerber .................... 296/146.5 |
| 2002/0073625 A1* | 6/2002 | Jennings ...................... 49/502 |
| 2002/0073627 A1* | 6/2002 | Hock .......................... 49/502 |
| 2003/0107236 A1* | 6/2003 | Ornig et al. .............. 296/146.5 |
| 2004/0012226 A1* | 1/2004 | Morrison et al. ........ 296/146.5 |
| 2005/0052050 A1* | 3/2005 | Kora et al. ............... 296/146.1 |
| 2005/0093334 A1* | 5/2005 | Koa et al. ................ 296/146.5 |

FOREIGN PATENT DOCUMENTS

| | | |
|---|---|---|
| DE | 199 37 000 A1 | 2/2001 |
| FR | 2 813 242 A1 | 3/2002 |

* cited by examiner

VEHICLE DOOR AND METHOD FOR THE PRODUCTION THEREOF

CROSS-REFERENCE TO RELATED APPLICATIONS

This application is the U.S. national phase of international patent application PCT/EP03/03967, filed on Apr. 16, 2003 and claims priority to German patent application No. 102 17 831.3, filed Apr. 16, 2002, all of which are hereby incorporated by reference.

The present invention relates to a vehicle door and to a method for the production thereof.

BACKGROUND OF THE INVENTION

Vehicles doors are known which have a supporting frame provided with a central opening, said supporting frame being connected movably to a body structure of the vehicle (in the case of conventional automotive vehicle side doors via an articulation, in the case of small buses via rails). Such a door is described for example in the German patent application DE 101 26 250.

It is disadvantageous in such a known door with a supporting frame that individual components, e.g. for fixing the window winding mechanism or for mounting loudspeakers, door lock elements etc. on the supporting frame, need to be mounted with great complexity. In addition, it is disadvantageous that, within the supporting frame which normally is sealed inwardly by a door interior lining and outwardly by exterior panelling, no defined separation of the wet/dry region is given so that, with a movable window pane provided in the door, moisture penetration into sensitive components, such as e.g. loudspeakers, is possible in certain circumstances.

The object therefore underlying the present invention is to provide a vehicle door and a method for the production thereof, the production costs being low and a defined separation of wet and dry regions in the door interior being given in order to ensure long term quality.

This object preferably is achieved by the characterizing features of the present invention.

BRIEF SUMMARY OF TILE INVENTION

As a result of the fact that, in the case of a method for producing an automotive vehicle door which has a supporting frame provided with an opening, said supporting frame being connected movably to a body structure of the vehicle, the opening is sealed in an essentially moisture-proof manner by moulding with a curable material whilst forming a supporting plate for receiving elements, such as window winders, loudspeakers or the like, at least one guide rail for guiding a window pane, which is displaceable relative to the supporting frame, being provided in the supporting plate in order to receive a lateral edge of the window pane, the additional elements no longer require to be mounted directly on the supporting frame in a complex manner. Instead, practically the entire surface area of the opening is usable. In addition, a clear separation of interior and exterior space is possible since the central opening can be sealed by the supporting plate. As a result, the penetration of liquid is limited on the one hand, in addition the travelling comfort is increased (by noise insulation as a result of the additional layer) and the vehicle safety is increased (since the supporting plate also has an energy-absorbing effect in a side collision). It is particularly advantageous that an additional seal can generally be dispensed with in the mounting region of the supporting plate and supporting frame since, in normal moulding methods, a liquid-proof connection is produced.

This construction is suitable in particular for doors with a "frame construction". These frame constructions are common in particular in lightweight construction vehicles and also in the case of economically manufactured small cars. The advantages of the frame construction reside in the simple construction and the particularly good lightweight construction option. It is for example possible therefore to achieve a corresponding frame construction by means of metal profiles which are inserted into each other. The difference between these frame constructions and normal car doors, which are constructed from multi-layer metal sheets, resides in particular in the fact that, due to the increased strength of the edge of the frame construction, generally merely one (with a very large surface area) opening is provided which can be sealed in a moisture-proof manner preferably by the supporting plate. A circumferential flange must hereby be provided in the opening preferably at the inner edge, said flange being injection moulded preferably on both sides in order on the one hand to achieve a particularly firm fixing to the supporting plate and in addition to make moisture penetration impossible.

It is very particularly essential for the invention that window guide rails for lateral guidance are in practice jointly injection moulded (see in particular FIG. 2c further on). As a result, it is possible to catch the lateral edges of a window pane. As a result of the fact that these lateral rails enable particularly good guidance, particularly well guided panes are possible even when there is no upper window frame (as is often the case for example with coupés). It is particularly suitable to provide in addition "U"-shaped inserts made of a very smooth material into the jointly injection moulded lateral window guide rail in order to achieve displacement of the window pane with as little force as possible.

Integration of the window guide rail has several advantages. Relative to lateral window guide rails which are screwed on separately, shortening of the tolerance chain can be established since the window guide rail is coupled directly to the frame in the injection moulding process and hence no additional subsequent manufacturing tolerances occur.

In total, it can therefore be established that, with the supporting frame according to the invention which is produced with the method according to patent claim 1, an automotive vehicle door is obtained which can be produced very rapidly and economically since even the window guide systems are entirely incorporated into the supporting plate and the remaining components, such as for instance window winder drive, loudspeakers etc., can be integrated into the supporting plate. The exterior or interior panellings serve accordingly merely for subsequent decoration or further protection of the door. It is of course possible to use another subsequent transverse support in order to further increase stability, which transverse support is introduced preferably after implementation of the injection moulding process.

Advantageous embodiments and further developments of the solution will be apparent from the description of the invention provided herein.

An advantageous development provides that merely one single opening is provided in the supporting frame, which opening is sealed by the supporting plate. This is normally to be found below the window breast, the further delimitation takes place by means of a front and rear spar which, in the case of an automotive vehicle front door, abuts against the A or B column, and by means of a lower connection web between these two lateral spars.

A further advantageous development provides that the surface area of the opening, in a ratio to the surface area of the surface area enclosed by the outer contour of the supporting frame, is more than 0.4, preferably more than 0.5. It is clear through this ratio that, in the present door in contrast to injection moulded small bridgings, the entire door opening is bridged by a supporting plate. This is consequently shown in that the supporting plate has lateral guide rails for catching a window pane.

One advantageous development provides that the moulding takes place by injection of a thermoplastic or thermoset plastic material. For this purpose, normal injection moulding methods for plastic material moulded parts can be applied so that practically any shapes can be produced for the supporting plate and its topography in order to mount elements, such as window winders, loudspeakers etc. A particularly advantageous development hereby provides that as curable material PPLGF (polypropylene long glass fibre material) is used. This has the advantage of a high low-temperature impact resistance, the passive safety of the vehicle is improved by the energy-absorbing properties of this material.

It is of course also possible to produce the supporting plate by other moulding methods, for instance by foaming with a multi-component foaming agent; sandwich structures can also be produced by a plurality of subsequent moulding processes.

With respect to production technology, it is hereby particularly advantageous if the supporting frame (which can be produced in one part or multi-parts) is inserted as a whole into an injection moulding or foaming tool in order to mould the supporting plate.

A particularly advantageous development provides that an outer edge of the central opening of the supporting frame has a circumferential web for form-fitting and integral connection of the supporting plate to the supporting frame. As a result, a defined connection is made possible since the supporting plate can engage around this circumferential web for example on both sides in order to ensure a liquid-proof and secure connection between the supporting plate and supporting frame. It is particularly simple here to produce a liquid-proof supporting plate which completely seals a central opening of the supporting frame.

A further advantageous development provides that, after moulding the supporting plate, there is mounted detachably or non-detachably on the side orientated towards the vehicle interior, an interior lining and/or, on the side of the supporting plate pointing towards the vehicle exterior, an exterior panelling. By means of a detachable mounting, repair of the door or elements thereof disposed on the supporting plate is greatly facilitated since hence access can be gained rapidly to the supporting plate on both sides. This is in addition an advantage when recycling individual components or when exchanging the exterior panelling in order to change the exterior colour of the vehicle.

The supporting frame according to the invention can have various shapes. On the one hand it can be produced in one or multi-parts. The frame profile can be produced with normal production methods from any materials (in particular plastic materials or metals). Thus for example a supporting frame made of an aluminium diecasting can be represented. Another possibility resides in shaping steel sheets into a profile shape (e.g. double-steel-sheet).

A particularly advantageous development provides that a guide rail for guiding a window pane, which is displaceable relative to the supporting frame, is provided in the supporting frame or in the supporting plate. Hence it is no longer necessary to provide special window rails which are adjustable relative to the frame in a complex manner, the susceptibility to faults and also the assembly time is consequently improved.

A further development provides that the supporting plate contains a reinforcing support or is connected to the latter which crosses the opening of the supporting frame. As a result, increased requirements for passive safety in the case of a side collision can be represented again.

It can therefore be established in summary that overall the invention makes possible the representation of a very lightweight vehicle door shell and a very lightweight door, with simultaneous reduction in assembly times for the components and a significant cost advantage due to integration of components. A clean separation of the wet and dry region of the door is thereby produced at the same time, which leads to quality improvement. The main advantages are therefore weight reduction, cost saving, saving in assembly time, increase in quality.

Further advantageous developments of the invention are indicated in the remaining dependent claims.

BRIEF DESCRIPTION OF THE DRAWINGS

The following invention is now explained with reference to several Figures, which show.

DETAILED DESCRIPTION OF THE INVENTION

Figure 1:
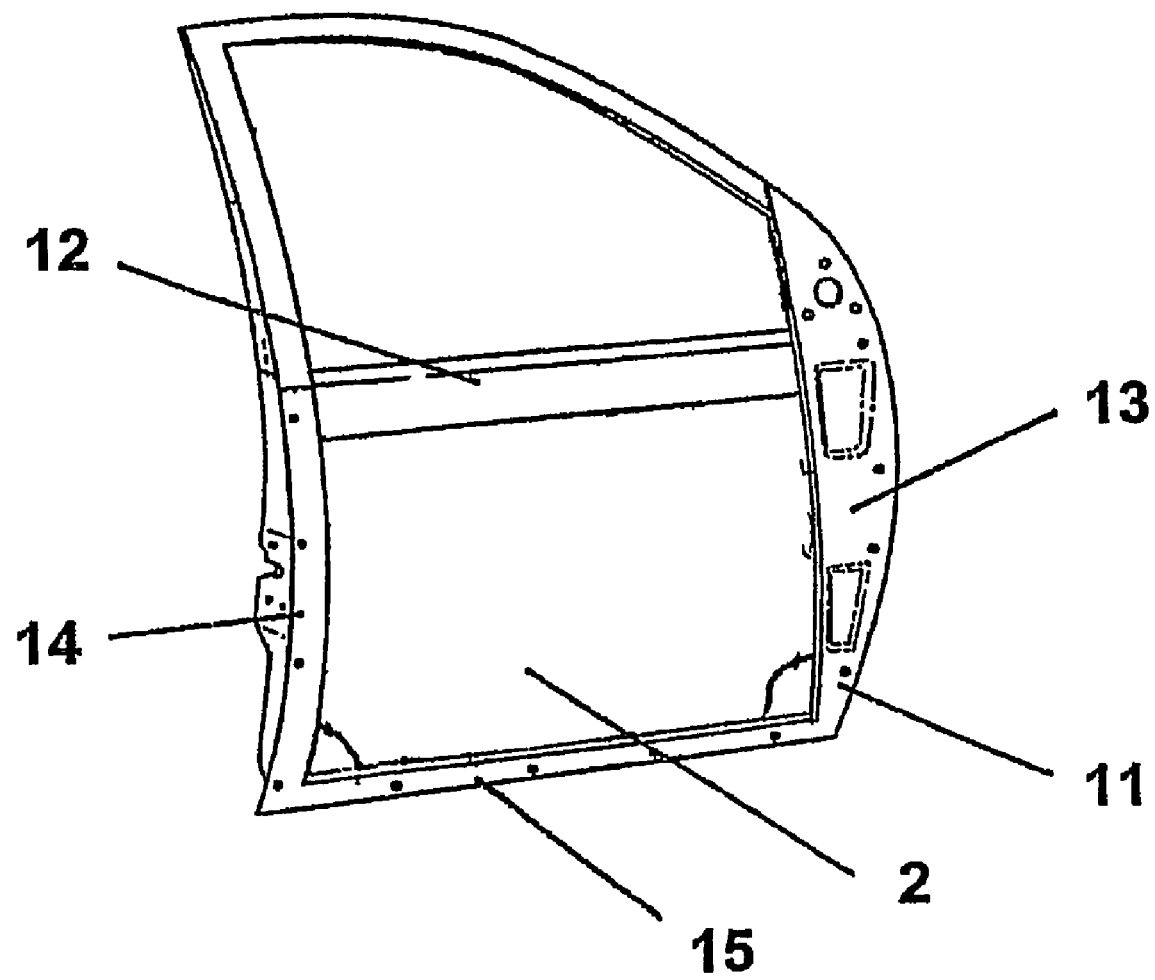
FIG. 1 a supporting frame with an opening not yet filled by a supporting plate.

FIG. 1 shows a supporting frame 11 for an automotive vehicle door. This door represents a right side door of a car, the door has a central opening 2 in the lower portion, which opening is delimited at the top by an upper spar 12 which also represents a window breast for a window pane opening situated thereabove. The frame 11 can have for example as individual parts the lateral parts 13 and 14 and the spars 12 and 15 which border the central opening 2. In order to increase the passive safety, it can be provided that the central opening 2 is crossed by a reinforcing support, e.g. made of metal.

Figure 2A:
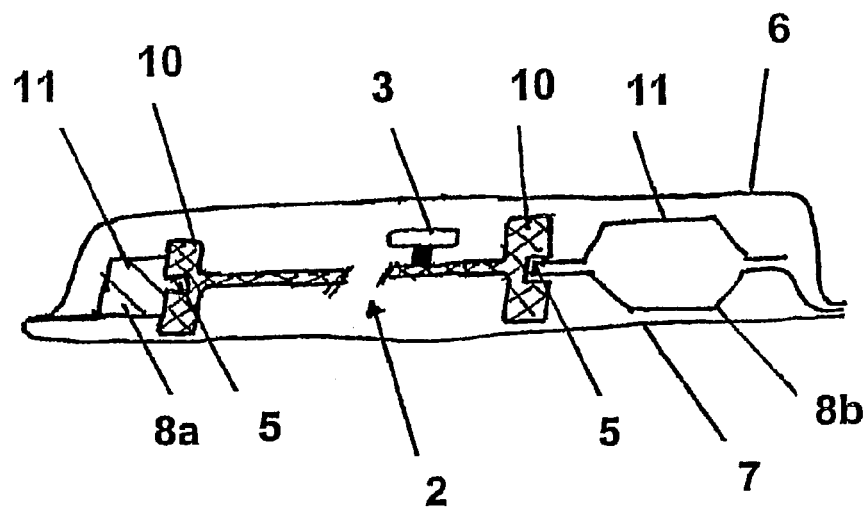
FIGS. 2a to 2c various embodiments of profiles of supporting frames with coupled supporting plates, and FIG. 3 an exploded drawing of an automotive vehicle door according to the invention.

The frame 11 is inserted into an injection moulding tool in order to form a supporting plate according to the invention. By means of a moulding process taking place in this injection moulding tool, the opening 2 is sealed at least in regions by moulding with a curable material whilst forming a supporting plate 10 for receiving elements, such as window winders, loudspeakers 3 or the like. In the present case, the supporting plate shown in FIGS. 2a to 2c and 3 is made of PPLGF (polypropylene long glass fibre material). Alternatively, of course all other materials can be applied which are curable (any plastic materials, foaming agent materials etc., see above). FIG. 2a shows a schematic cross-section through a vehicle door according to the invention. In the following the construction of the profiles of the supporting frame 11 and of the connection to the supporting plate 10 is herewith explained.

Figure 2B:
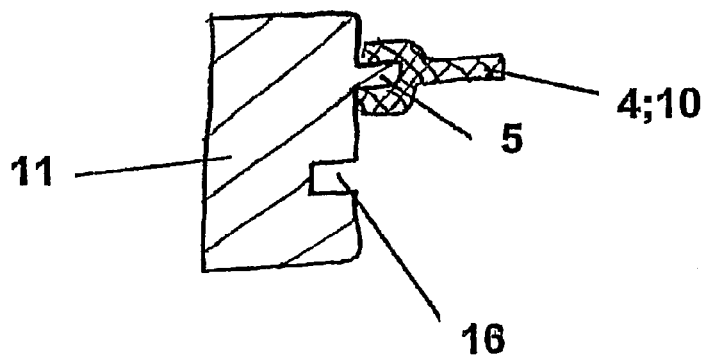
Figure 2C:
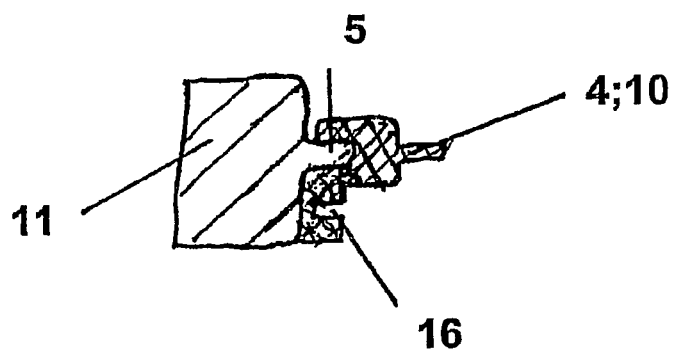

Two alternative supporting profile shapes are shown in FIG. 2a. In the embodiment 8a, this is an aluminium diecast profile, in the embodiment 8b a hollow profile produced by shaping processes from a steel sheet (double-steel-sheet). Both profiles (8a, 8b) have on the outer edge of the opening 2 respectively a circumferential web 5 for form-fitting and integral connection of the supporting plate 10 to the supporting frame 11. It is possible as a result, as shown in FIGS. 2a to 2c, that the supporting plate 10 encompasses the web circumferentially due to the moulding process and hence a liquid-proof connection is given by the supporting plate 10 (on the condition that the supporting plate 10 completely seals the opening 2). The door shown in FIG. 2a is shown in a longitudinal section (plan view on a right car door). An interior lining 6 is mounted detachably on the supporting frame 11 on the side orientated towards the vehicle interior. In the intermediate space between the interior lining 6 and the supporting plate 10, elements, such as loudspeakers, electrical operating elements (e.g. for actuating electrical exterior mirrors etc.) are accommodated. On the side of the supporting plate 10, which is orientated away from the vehicle interior, an exterior panelling 7 is provided which is mounted detachably on the supporting frame 11.

FIGS. 2b and 2c show details of different supporting frame profiles. In FIG. 2b, an example is shown which is essentially that of the profile 8a from FIG. 2a, in addition a rail for guiding a window pane 9 (see FIG. 3) in the profile being provided in the profile. As a result, the alignment of the window pane can be produced more rapidly and more precisely.

In FIG. 2c, an alternative embodiment is shown in which a window winding rail is part of the moulded supporting plate 10. A further improved seal or low-noise guidance of the window pane 9 is hereby advantageous (according to choice of material).

Figure 3:
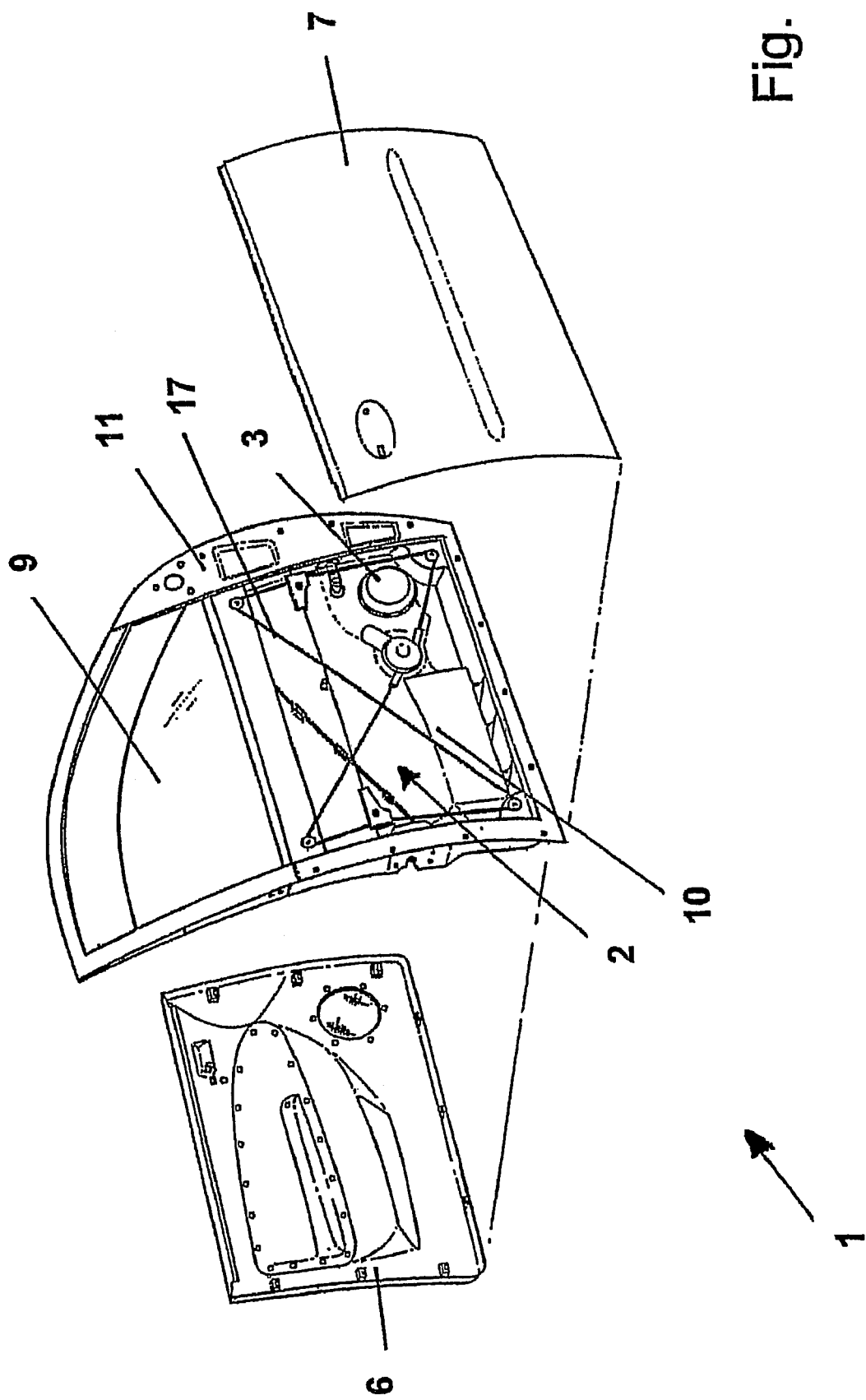

FIG. 3 shows a complete automotive vehicle door 1. On the side of the automotive vehicle door which is orientated towards the automotive vehicle interior, a lining 6 can be applied detachably. On the side of the door which points away from the automotive vehicle interior, an exterior panelling 7 is mounted detachably. The opening 2 of the supporting frame 11 is sealed by the supporting plate 10 in a liquid-proof manner.

The automotive vehicle door 1 is completely equipped in FIG. 3. This means that e.g. a loudspeaker 3 is applied in FIG. 3 on the rear side of the supporting plate 10. On the side of the supporting plate 10 which is orientated towards the exterior panelling 7, a window pane 9, which is movable relative to the supporting frame, is guided displaceably. For this purpose, a lifting mechanism with cable controls 17 and corresponding deflection rollers is applied in order to displace the pane 9 in the guide rails 16 according to the requirements of an automotive vehicle passenger.

It may be noted that the supporting frame can of course also have configurations other than those in FIGS. 1 and 3. Thus for example a support of the window pane in the upper B and C column region is not always necessary, i.e. above the spar 12 (e.g. in coupe automotive vehicles).

The embodiment of an automotive vehicle door shown in connection with FIG. 2c is particularly essential. This has a supporting frame 11 provided with an opening 2, said supporting frame being connected movably to a body structure of the vehicle (for instance via two rotatable hinges). The opening 2 is sealed in an essentially moisture-proof manner and/or completely by moulding with a curable material whilst forming a supporting plate 10 for receiving elements, such as window winders, loudspeakers or the like.

It is hereby suitable that the supporting frame, which can comprise for example diecast profiles, has a circumferential flange on its inside, said flange being injection moulded by the curable material. At least one guide rail for guiding a window pane, which is displaceable relative to the supporting frame, is provided in the supporting plate in order to receive a lateral edge of the window pane. As a result, it is possible for example to provide a guide rail on two sides of a window pane, which guide rail is produced integrally in an injection moulding tool during injection moulding of the supporting frame. As a result, the production times are shortened, the tolerance chain is shortened in addition as described above. In order to improve the sliding property, it is of course possible to introduce a U-shaped element into the rail 16, which element is low-friction or coated to be low-friction and hence keeps the lever forces minimal. This U-shaped element can either be jointly injection moulded simultaneously or else be inserted subsequently.

The integral injection moulding of the guide rail is particularly advantageous in the case of the doors shown here with supporting frames since, (in contrast to doors with a normal sheet metal layer construction which have a securely mounted outer metal sheet), accessibility and assemblibility is very good. For current small cars with support frame doors, a completely new approach is however also offered with the invention since, in the case of such vehicles, door module inserts have to date not been used, even in the case of mass-produced vehicles, the separation of wet and dry space takes place here by means of a film which is glued on the frame.

The invention claimed is:

1. Method for producing an automotive vehicle door, comprising (i) providing a supporting frame having an opening, said supporting frame being connected movably to a body structure of an automotive vehicle, and (ii) sealing the opening in an essentially moisture-proof manner by moulding with a curable material whilst forming a supporting plate for receiving elements, at least one guide rail for guiding a window pane, which is displaceable relative to the supporting frame, being provided in the supporting plate in order to receive a lateral edge of the window pane.

2. Method according to claim 1, wherein the moulding takes place by injection of a thermoplastic or thermoset plastic material.

3. Method according to claim 1, wherein the curable material is polypropylene long glass fiber (PPLGF) material.

4. Method according to claim 1, wherein the moulding takes place by foaming with a multi-component foaming agent material.

5. Method according to claim 1, wherein the moulding takes place by injection moulding.

6. Method according to claim 1, wherein an outer edge of the opening has a circumferential web for form-fitting and integral connection of the supporting plate to the supporting frame.

7. Method according to claim 1, wherein the opening is completely sealed in order to produce a liquid-proof supporting plate.

8. Method according to claim 1, wherein, after moulding the supporting plate, there is mounted on the side orientated towards the vehicle interior, an interior lining or, on the side of the supporting plate pointing towards the vehicle exterior, an external panelling.

9. Method according to claim 1, wherein the supporting frame is produced in a shaping method.

10. Method according to claim 1, wherein the supporting frame is one part.

11. Method according to claim 1, wherein merely one opening is provided in the supporting frame which is sealed by the supporting plate.

12. Method according to claim 11, wherein the surface area of the opening, in a ratio to the surface area of the surface area enclosed by the outer contour of the supporting frame, is more than 0.4.

13. Vehicle door produced according to claim 1.

14. Method for producing an automotive vehicle door, comprising (i) providing a supporting frame having an opening, said supporting frame being connected movably to a body structure of the vehicle, and (ii) sealing the opening at least in regions by moulding with a curable material whilst forming a supporting plate for receiving elements, wherein the curable material is polypropylene long glass fiber (PPLGF) material.

15. Vehicle door produced according to claim 14.

16. Method for producing an automotive vehicle door, comprising (i) providing a supporting frame having an opening, said supporting frame being connected movably to a body structure of the vehicle, and (ii) sealing the opening at least in regions by moulding with a curable material whilst forming a supporting plate for receiving elements, wherein the moulding takes place by foaming with a multi-component foaming agent material.

17. Vehicle door produced according to claim 16.

18. Method for producing an automotive vehicle door, comprising (i) providing a supporting frame having an opening, said supporting frame being connected movably to a body structure of the vehicle, and (ii) sealing the opening at least in regions by moulding with a curable material whilst forming a supporting plate for receiving elements, wherein an outer edge of the opening has a circumferential web for form-fitting and integral connection of the supporting plate to the supporting frame.

19. Vehicle door produced according to claim 18.

20. Method for producing an automotive vehicle door, comprising (i) providing a supporting frame having an opening, said supporting frame being connected movably to a body structure of the vehicle, and (ii) sealing the opening at least in regions by moulding with a curable material whilst forming a supporting plate for receiving elements, wherein the supporting frame is produced in a shaping method.

21. Vehicle door produced according to claim 20.

22. Method for producing an automotive vehicle door, comprising (i) providing a supporting frame having an opening, said supporting frame being connected movably to a body structure of the vehicle, and (ii) sealing the opening at least in regions by moulding with a curable material whilst forming a supporting plate for receiving elements, wherein the supporting frame is one part.

23. Vehicle door produced according to claim 22.

24. Method for producing an automotive vehicle door, comprising (i) providing a supporting frame having an opening, said supporting frame being connected movably to a body structure of the vehicle, and (ii) sealing the opening at least in regions by moulding with a curable material whilst forming a supporting plate for receiving elements, wherein merely one opening is provided in the supporting frame which is sealed by the supporting plate and wherein the surface area of the opening, in a ratio to the surface area of the surface area enclosed by the outer contour of the supporting frame, is more than 0.4.

25. Vehicle door produced according to claim 24.

\* \* \* \* \*